(12) United States Patent
Lee et al.

(10) Patent No.: US 9,094,063 B1
(45) Date of Patent: *Jul. 28, 2015

(54) MULTI-STREAM SOFT DEMODULATION USING HARD-DECISION SCHEMES

(71) Applicant: MARVELL INTERNATIONAL LTD., Hamilton (BM)

(72) Inventors: Jungwon Lee, Cupertino, CA (US); Hui-Ling Lou, Sunnyvale, CA (US); Jiwoong Choi, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/846,361

(22) Filed: Mar. 18, 2013

Related U.S. Application Data

(63) Continuation of application No. 12/469,382, filed on May 20, 2009, now Pat. No. 8,401,127.

(60) Provisional application No. 61/061,799, filed on Jun. 16, 2008.

(51) Int. Cl.
| | | |
|---|---|---|
| *H04B 7/02* | (2006.01) | |
| *H04B 7/08* | (2006.01) | |
| *H04L 1/06* | (2006.01) | |
| *H04L 27/06* | (2006.01) | |
| *H04B 7/04* | (2006.01) | |

(52) U.S. Cl.
CPC .................................. *H04B 7/0413* (2013.01)

(58) Field of Classification Search
CPC ................ H04B 7/0413; H04L 1/06
USPC ................................... 375/267, 340, 341, 347
See application file for complete search history.

(56) References Cited

U.S. PATENT DOCUMENTS

| | | | | |
|---|---|---|---|---|
| 7,469,014 | B2 * | 12/2008 | Abe et al. ....................... | 375/262 |
| 8,054,909 | B2 | 11/2011 | Bahng et al. | |

(Continued)

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

(Continued)

*Primary Examiner* — Betsy Deppe

(57) ABSTRACT

A method of decoding a signal transmitted via a multiple input multiple output (MIMO) communication channel. The method includes receiving a data symbol vector having a plurality of data symbols received via a plurality of spatial streams. The received data symbol vector corresponds to a transmitted data symbol vector having a plurality of transmitted data symbols corresponding to the plurality of data symbols. The method also includes estimating, using a hard-decision technique, one or more respective values for one or more first transmitted data symbols in a first set of one or more spatial streams. The method additionally includes calculating, using a soft-decision technique and based on the estimated one or more respective values for the one or more first transmitted data symbols, likelihood values for bits corresponding to one or more second transmitted data symbols in a second set of one or more spatial streams.

24 Claims, 7 Drawing Sheets

(56) References Cited

U.S. PATENT DOCUMENTS

| | | | |
|---|---|---|---|
| 8,073,069 | B2 | 12/2011 | Mundarath et al. |
| 8,331,475 | B1 | 12/2012 | Palanivelu et al. |
| 8,351,549 | B1 | 1/2013 | Choi et al. |
| 8,401,127 | B1* | 3/2013 | Lee et al. .................... 375/341 |
| 2005/0018789 | A1* | 1/2005 | Jia et al. ...................... 375/347 |
| 2007/0127589 | A1* | 6/2007 | Hwang et al. ................ 375/267 |

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11b-1999 (Supplement to ANSI/IEEE Std 802.11, 1999 Edition) "Supplement to IEEE Standard for Information technology—Telecommunications and information exchange between systems-Local and metropolitan area networks-Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, pp. 1-89 (Sep. 1999).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).

IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE Std 802.16-2004 (Revision of IEEE Std 802.16-2001), "IEEE Standard for Local and metropolitan area networks; Part 16: Air Interface for Fixed Broadband Wireless Access Systems," *The Institute of Electrical and Electronics Engineers, Inc.*, 893 pages (Oct. 1, 2004).

IEEE P802.16Rev2/D5 (Jul. 2008) (Revision of IEEE Std 802.16-2004 and consolidates material from IEEE Std 802.16e-2005, Std 802.16-2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, pp. 1-1970 (Jun. 2008).

Mujtaba, S.A. "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Office Action in U.S. Appl. No. 12/562,687, dated Jan. 20, 2012 (6 pages).

Notice of Allowance in U.S. Appl. No. 12/562,687, dated May 1, 2012 (7 pages).

Notice of Allowance in U.S. Appl. No. 12/562,687, dated Sep. 11, 2012 (8 pages).

* cited by examiner

MULTI-STREAM SOFT DEMODULATION USING HARD-DECISION SCHEMES

CROSS REFERENCE TO RELATED APPLICATION

The present disclosure is a continuation of U.S. application Ser. No. 12/469,382, now U.S. Pat. No. 8,401,127, filed May 20, 2009, entitled "Multi-Stream Soft Demodulation Using Hard-Decision Schemes," which claims the benefit of U.S. Provisional Patent App. No. 61/061,799, entitled "Dimension Reduction for MIMO Soft ML Demodulation Based on Hard-Decision Methods," filed on Jun. 16, 2008. The entire disclosures of both of the applications referenced above are hereby expressly incorporated herein by reference.

FIELD OF TECHNOLOGY

The present disclosure relates generally to multi-antenna wireless systems and, more particularly, to multi-stream soft demodulation using hard decisions.

BACKGROUND

An ever-increasing number of relatively inexpensive, low power wireless data communication services, networks and devices have been made available over the past number of years, promising near wire speed transmission and reliability. Various wireless technology is described in detail in the 802 IEEE Standards, including for example, the IEEE Standard 802.11a (1999) and its updates and amendments, the IEEE Standard 802.11g (2003), and the IEEE Standard 802.11n now in the process of being adopted, all of which are collectively incorporated herein fully by reference. These standards have been or are in the process of being commercialized with the promise of 54 Mbps or higher data rate, making them a strong competitor to traditional wired Ethernet and the more common "802.11b" or "WiFi" 11 Mbps mobile wireless transmission standard.

Generally speaking, transmission systems compliant with the IEEE 802.11a and 802.11g or "802.11a/g" standards as well as the IEEE 802.11n standard achieve their high data transmission rates using Orthogonal Frequency Division Multiplexing (OFDM) encoded symbols. Generally speaking, the use of OFDM divides the overall system bandwidth into a number of frequency sub-bands or channels, with each frequency sub-band being associated with a respective sub-carrier. Data upon each sub-carrier may be modulated with a modulation scheme such as QAM, phase shift keying, etc. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards as well as other standards such as the 802.16 IEEE Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16 IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconversion, conventional analog to digital conversion and Fast Fourier Transformation of the received time domain analog signal. Thereafter, the baseband processor performs frequency domain equalization (FEQ) and demodulation to recover the transmitted symbols. The recovered and recognized stream of symbols is then decoded, which may include deinterleaving and error correction using any of a number of known error correction techniques, to produce a set of recovered signals corresponding to the original signals transmitted by the transmitter.

For ease of explanation, in the examples presented herein, streams and symbols have a one-to-one correspondence. That is, a single stream is associated with a single symbol and vice versa. Accordingly, the words "streams" and "symbols" may be used interchangeably. However, it should be understood that a given stream, for example, may have a number of associated symbols and vice versa.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

To further increase the number of signals which may be propagated in the communication system and/or to compensate for deleterious effects associated with the various propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the 802.11n IEEE Standard now being adopted. Various other standards and projects, such as the 802.16 standard, or WiMAX, and the Long Term Evolution (LTE) project, support MIMO techniques. Generally speaking, the use of MIMO technology produces significant increases in spectral efficiency and link reliability of IEEE 802.11, IEEE 802.16, and other systems, and these benefits generally increase as the number of transmit and receive antennas within the MIMO system increases.

In addition to the frequency sub-channels created by the use of OFDM, a MIMO channel formed by the various transmit and receive antennas between a particular transmitter and a particular receiver may include a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

The transmitters and receivers in the wireless communication system may each be capable of using a variety of modulation schemes. For example, some modulations schemes may provide a higher bit rate than other schemes (e.g., 64-QAM vs. 16-QAM). Typically, modulation schemes that provide a higher bit rate may be more sensitive to channel impairments as compared to modulation schemes with a lower bit rate.

Different modulation/demodulation schemes have various degrees of complexity, and complexity of a given demodulation technique may affect the complexity of a receiver. Higher complexity of a demodulation technique generally requires more complexity on the receiver, e.g., more, larger, and/or more expensive processing modules and/or components. Higher complexity of a demodulation technique may also lead to an increase in processing time and an increase in power consumption.

SUMMARY

The present disclosure provides methods and apparatus for estimating and compensating for soft demodulation using hard-decision schemes.

In one embodiment, a method of decoding a signal transmitted via a multiple input multiple output (MIMO) communication channel includes receiving a data symbol vector having a plurality of data symbols received via a plurality of spatial streams, the received data symbol vector corresponding to a transmitted data symbol vector having a plurality of transmitted data symbols corresponding to the plurality of data symbols. The method also includes estimating, using a hard-decision technique, one or more respective values for one or more first transmitted data symbols in a first set of one or more spatial streams of a plurality of spatial streams. The method additionally includes calculating, using a soft-decision technique and based on the estimated one or more respective values for the one or more first transmitted data symbols, likelihood values for bits corresponding to one or more second transmitted data symbols in a second set of one or more spatial streams of the plurality of spatial streams.

In another embodiment, a device for decoding a signal transmitted via a multiple input multiple output (MIMO) communication channel comprises a multi-stream demodulator configured to receive a data symbol vector having a plurality of data symbols received via a plurality of spatial streams, the received data symbol vector corresponding to a transmitted data symbol vector having a plurality of transmitted data symbols corresponding to the plurality of data symbols. The multi-stream demodulator is also configured to estimate, using a hard-decision technique, one or more respective values for one or more first transmitted data symbols in a first set of one or more spatial streams of the plurality of spatial streams. The multi-stream demodulator is further configured to calculate, using a soft decision technique and based on the estimated one or more respective values for the one or more first transmitted data symbols, likelihood values for bits corresponding to one or more second transmitted data symbols in a second set of one or more spatial streams of the plurality of spatial streams. The device additionally includes a decoder configured to decode at least some of the data symbols in the received data symbol vector based at least in part on the calculated likelihood values.

In yet another embodiment, a device for decoding a signal transmitted via a multiple input multiple output (MIMO) communication channel compromises a multi-stream demodulator configured to receive a data symbol vector comprising a plurality of data symbols that are received via different spatial streams, wherein the received data symbol vector corresponds to a transmitted data symbol vector comprising a plurality of transmitted data symbols corresponding to the plurality of data symbols. The multi-stream demodulator is also configured to estimate one or more respective values for transmitted data symbols in a first group of one or more transmitted data symbols using a hard-decision technique, wherein the first group of one or more transmitted data symbols is of the plurality of transmitted data symbols. The multi-stream demodulator is further configured to calculate, using a soft decision technique, likelihood values for bits in a second group of one or more transmitted data symbols based on the estimated one or more respective values of the one or more transmitted data symbols in the first group of one or more transmitted data symbols, wherein the second group of one or more transmitted data symbols is of the plurality of transmitted data symbols, and wherein the first group of one or more transmitted data symbols and the second group of one or more transmitted data symbols do not include common transmitted data symbols. The device additionally includes a decoder configured to decode at least some of the data symbols in the received data symbol vector based at least in part on the calculated likelihood values.

BRIEF DESCRIPTION OF THE DRAWINGS

Like reference numbers and designations in the various drawings indicate like elements. Furthermore, when individual elements are designated by references numbers in the form Nn, these elements may be referred to in the collective by N. For example, FIGS. 2A and 2B illustrate transmitting devices 200a and 200b that may be referred to collectively as transmitting device(s) 200.

DETAILED DESCRIPTION

Figure 1:
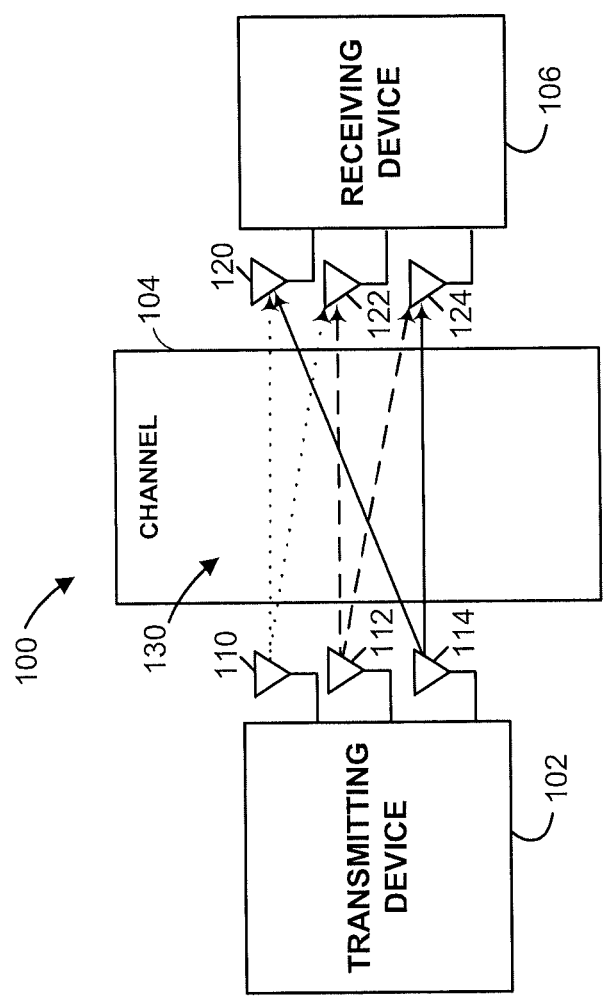
FIG. 1 is a block diagram of an example wireless communication system.

FIG. 1 is a block diagram of an example wireless communication system 100 in which multiple devices, e.g., a transmitting device 102 and a receiving device 106 may communicate with each other via a shared wireless communication channel 104. Each of the devices 102 and 106 may be, for example, a stationary device, such as a base station or a mobile station equipped with a set of antennas 110-114 and 120-124, respectively. Although the wireless communication system 100 illustrated in FIG. 1 includes two devices, the wireless communication system 100 may, of course, include any number of devices, each equipped with the same or a different number of antennas (e.g., 1, 2, 3, 4 antennas and so on).

Furthermore, although the wireless communication system 100 illustrated in FIG. 1 includes a transmitting device 102 and a receiving device 106, devices in the wireless communication system 100 may generally operate in multiple modes (e.g., a transmit mode and a receive mode). For example, if a given device is a mobile station in a WiMAX communication network or a lap top computer having an IEEE Standard 802.11n compliant wireless transceiver, the device may operate in both a transmit mode and a receive mode. Accordingly, in some embodiments, antennas 110-114 and 120-124 may support both transmission and reception. Alternatively, or additionally, a given device may include separate transmit antennas and separate receive antennas.

Different numbers of spatial streams 130 may be transmitted between the antennas 110-114 and 120-124 in various embodiments and/or configurations of the transmitting device 102 and/or the receiving device 106. Typically, the number S of spatial streams 130 associated with a shared communication channel 106 is less than or equal to minimum of the number $N_T$ of transmit antennas 110-114 and the number $N_R$ of receive antennas 120-124 (i.e., S≤min($N_T$,$N_R$)). The streams 130 may be defined in a variety of ways, e.g., according to various multiple-input and multiple-output (MIMO) modes or schemes, including those known in the art. For example, the transmitting device 102 may use the antennas 110-114 to improve channel diversity by transmitting multiple copies of the same symbol via several streams. Alternatively, the transmitting device 102 may transmit different symbols via each of the antennas 110-114 to increase throughput. As yet another alternative, the transmitting device 102 may operate in a mixed MIMO mode to improve both channel diversity and throughput.

The transmitting device 102 and the receiving device 106 may communicate using a single frequency or multiple frequencies. When the transmitting device 102 and the receiving device 106 communicate using a multiple frequencies, the communication channel 104 may include multiple carriers or subcarriers, each associated with a particular frequency at which the devices 102 and 106 may communicate. In some embodiments, the wireless communication system 100 may use an OFDM technique, and the subcarriers may be selected to be mutually orthogonal (i.e., to minimize cross-talk between each pair of subcarriers). However, the wireless communication system 100 could also use any other frequency division multiplexing technique.

The receiving device 106 may be configured to perform a multi-stream demodulation technique to be described in more detail below. Before describing the multi-stream demodulation techniques in detail, it is helpful to briefly explain how signals may be modulated.

Figure 2A:
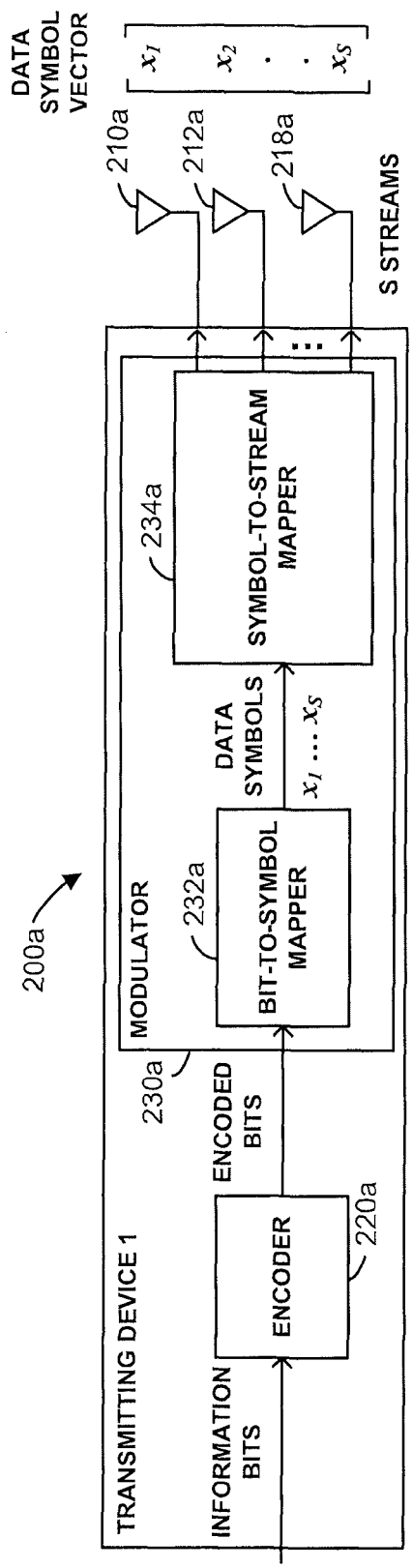
FIG. 2A is a block diagram of an example transmitting device.
Figure 2B:
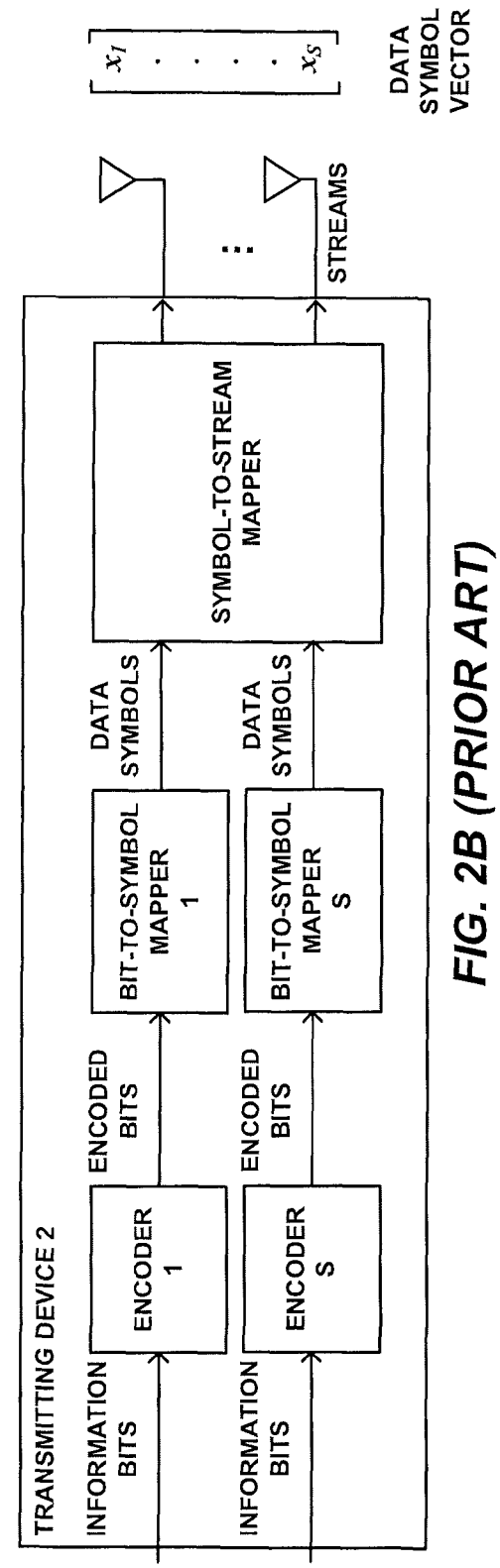
FIG. 2B is a block diagram of another example transmitting device.

FIGS. 2A-2B are block diagrams of example transmitting devices 200. The transmitting devices 200 may be utilized in the wireless communication system 100 as the transmitting device 102, for example. It will be understood, however, that the wireless communication system 100 may alternatively use another transmitting device 102.

Referring to FIG. 2A, the transmitting device 200a may generally convert a sequence of information bits into signals appropriate for transmission through a wireless channel (e.g., channel 104). More specifically, the transmitting device 200a may include an encoder 220a (e.g., a convolution encoder) that encodes information bits, and a modulator 230a that modulates the encoded bits into bit sequences referred to as "data symbols," which are mapped and converted to signals appropriate for transmission via transmit antennas 210a-218a. The transmitting device 200a may include various additional modules that, for ease of explanation, are not shown in FIG. 2A. For example, the transmitting device 200a may include an interleaver that interleaves the encoded bits to mitigate burst errors. The transmitting device 200a may further include an analog radio frequency (RF) front end for performing frequency upconversion, various filters, power amplifiers, and so on.

The modulator 230a may include a bit-to-symbol mapper 232a that maps encoded bits into multiple data symbols, and a symbol-to-stream mapper 234a that maps the multiple data symbols into multiple parallel data streams. For example, the modulator 230a may generate S parallel data streams that may be represented by a data symbol vector x=[$x_1$, $x_2$, . . . , $x_S$], and each individual symbol $x_s$ in the data symbol vector x may be a symbol representative of W bits ($b_{s,1}$, $b_{s,2}$, . . . , $b_{s,W}$). Accordingly, a given bit $b_{s,n}$ is the n-th bit in a data symbol of the s-th stream.

For ease of explanation, in the examples presented herein, streams and symbols have a one-to-one correspondence. That is, a single stream is associated with a single symbol and vice versa. Accordingly, the words "streams" and "symbols" may be used interchangeably. However, it should be understood that a given stream, for example, may have a number of associated symbols and vice versa. It should be further understood that, in some embodiments, the same symbol may be transmitted on multiple streams.

Figures 3A, 3B:
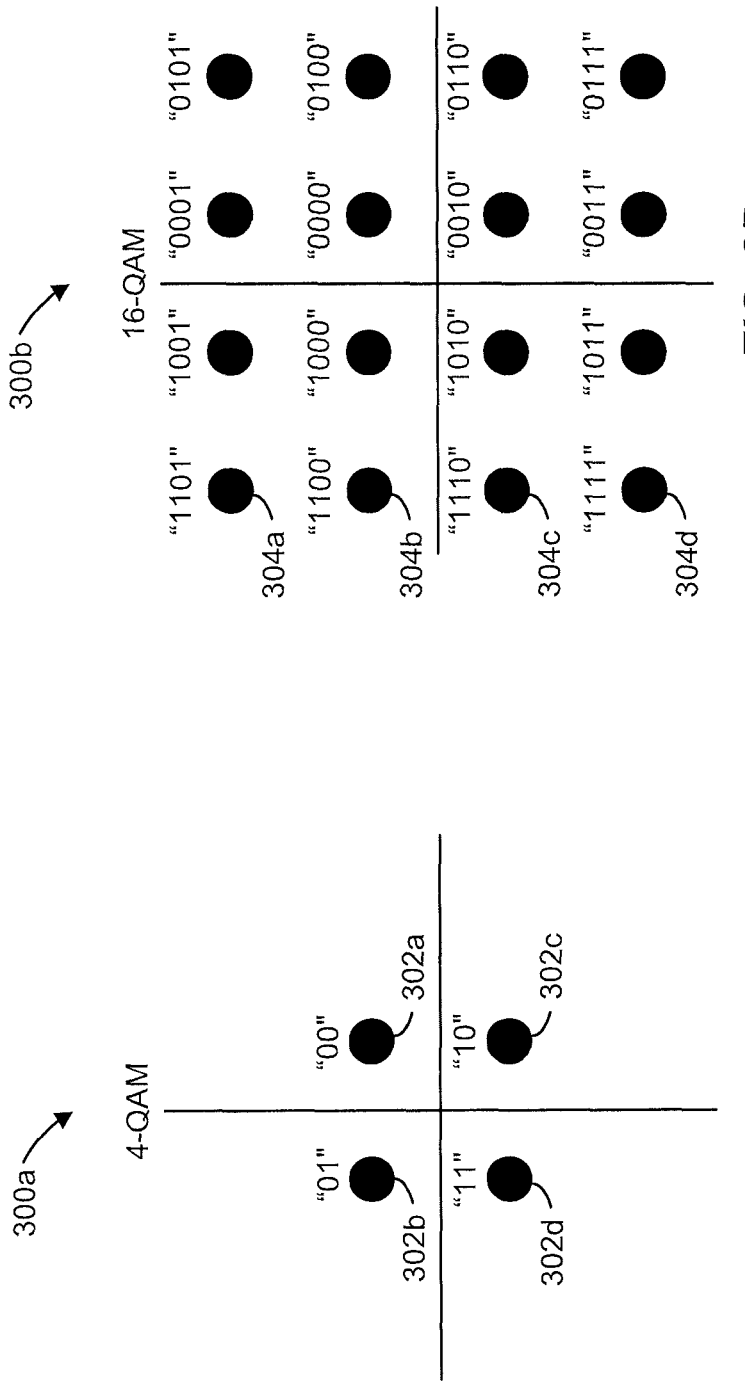
FIG. 3A is an example constellation set for a 4-QAM scheme.
FIG. 3B is an example constellation set for a 16-QAM scheme.

In some embodiments, the modulator 230a may use QAM to map bits to symbols in a QAM signal constellation set, where the symbols are differentiated from one another by phase and/or magnitude. For example, FIG. 3A illustrates a 4-QAM constellation set 300a in an in phase (I) and quadrature phase (Q) plane. In this case, constellation points 302a-302d are distinguishable only by phase. Each constellation point 302 represents a different two-bit symbol: 302a may represent "00," 302b may represent "01," 302c may represent "10," and 302d may represent "11." However, other bit to symbol mappings may be utilized.

Similarly, FIG. 3B illustrates a 16-QAM constellation set 300b, where four-bit sequences correspond to symbols. Here, both the amplitude and the phase of constellation points 304 may vary. FIG. 3B illustrates a mapping, where each constellation point 304 represents a different four-bit symbol: 304a may represent "1101," 304b may represent "1100," 304c may represent "1110," 304d may represent "1111," and so on. However, as discussed in reference to FIG. 3B, other mappings may be utilized.

In general, a W-bit symbol $x_s$ may be mapped according to an M-QAM signal set, where M=$2^W$. Thus, as illustrated in FIG. 3A, if the modulator 230a uses the 4-QAM modulation scheme, or a quadrature phase-shift keying (QPSK) modulation scheme, the modulator 230a will have a signal alphabet size of M=2²=4 (i.e., 4 constellation points), and will map 2-bit pairs into the 4 constellation points. If the modulator 230a uses a 64-QAM scheme, the modulator 230a will have an alphabet size of M=2⁶=64 (i.e., 64 constellation points) and will map 6-bit segments into the 64 constellation points.

It should be noted that although the transmitting device 200a described with reference to FIG. 2A includes a common encoder chain (an encoder 220a, an interleaver (not shown), a modulator 230a, etc.), a transmitting device 200 may include different encoder chains for different streams. For example, as illustrated in FIG. 2B, each stream generated by the transmitting device 200b may correspond to a separate encoder chain. Other transmitting devices, such as those supporting the WiMAX standards, for example, may support both a single-encoder option and a two-encoder option for a two-transmit-antenna configuration. In general, the number of encoders and/or encoder chains may be less than or equal to the number of transmitted streams S.

Figure 4:
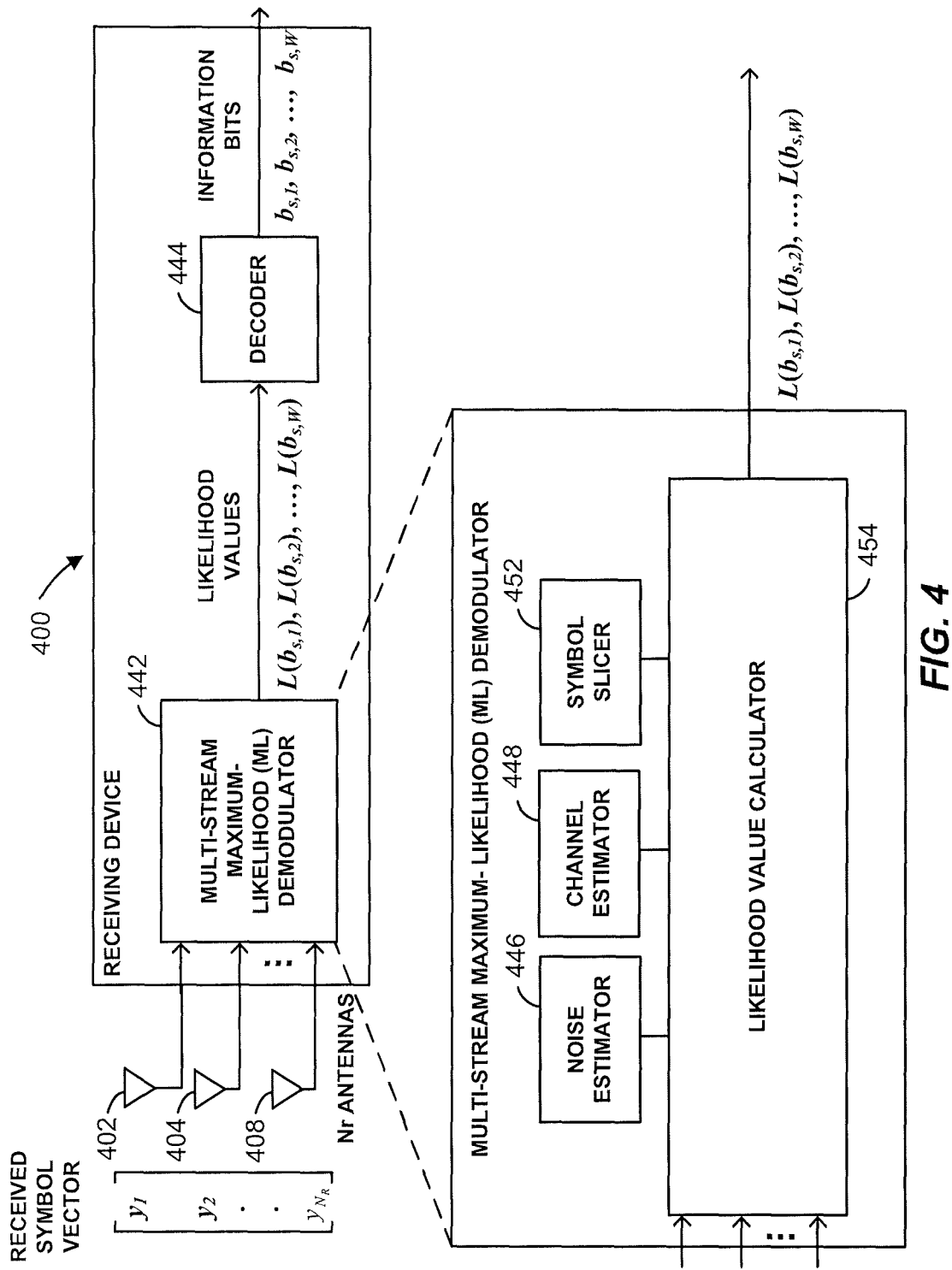
FIG. 4 is a block diagram of an example receiving device having a multi-stream demodulator.

FIG. 4 is a block diagram of an example receiving device 400 that demodulates and decodes signals from one or more transmitting devices using a multi-stream demodulation scheme. The receiving device 400 may be utilized in the wireless communication system 100 as the receiving device 106, for example. It will be understood, however, that the wireless communication system 100 may alternatively use another receiving device 106. Similarly, the receiving device 400 may receive and demodulate multiple streams transmitted by a device such as the transmitting device 200a of FIG. 2A or the transmitting device 200b of FIG. 2B or some other transmitting device.

Generally, the receiving device 400 may receive information via multiple receive antennas 402-408 and demodulate and decode the received information to estimate the information that was sent by a transmitting device. The receiving device 400 processes received information utilizing a model, such as:

$y=Hx+z$, where $$y = \begin{bmatrix} y_1 \\ y_2 \\ \vdots \\ y_{N_R} \end{bmatrix}; H = \begin{bmatrix} h_{1,1} & h_{1,2} & \ldots & h_{1,S} \\ h_{2,1} & h_{1,2} & \ldots & h_{2,S} \\ \vdots & \vdots & \vdots & \vdots \\ h_{N_R,1} & h_{N_R,2} & \ldots & h_{N_R,S} \end{bmatrix}; x = \begin{bmatrix} x_1 \\ x_2 \\ \vdots \\ x_S \end{bmatrix}; z = \begin{bmatrix} z_1 \\ z_2 \\ \vdots \\ z_{N_R} \end{bmatrix},$$

in which y represents, in vector form, a received signal, H represents a MIMO communication channel, x represents, in vector form, an estimated transmit signal, z represents a noise vector, and $N_R$ is the number of receive antennas. More precisely, $y_r$ is a received signal at antenna r, and $z_r$ is noise at an antenna r. Although $N_R$ is illustrated in FIG. 4 as being three, any number of multiple antennas may, in general, be utilized.

The MIMO communication channel H includes channel gain parameters $h_{r,s}$ representing channel gain in a stream s at a receive antenna r. In at least some of the embodiments, each channel gain $h_{r,s}$ is a complex number that incorporates an amplitude factor and a phase shift factor. In other words, each $h_{r,s}$ parameter may represent an attenuation coefficient associated with a certain propagation path as used in, for example, a Rayleigh fading channel model. The receiving device 400 may estimate the parameters and parameters associated with the noise z using any suitable technique, including known techniques.

With continued reference to FIG. 4, the receiving device 400 includes a multi-stream demodulator 442 that may calculate, based on the received symbols $y_1, y_2, \ldots, y_{N_R}$, likelihood values $L(b_{s,1}), L(b_{s,2}), L(b_{s,W})$ of the transmitted bits $b_{s,1}, b_{s,2}, b_{s,W}$. The receiving device 400 also includes a decoder 444 that may use the likelihood values $L(b_{s,1}), L(b_{s,2}), \ldots, L(b_{s,W})$ calculated by the demodulator 442 to estimate the transmitted information bits $b_{s,1}, b_{s,2}, \ldots, b_{s,W}$. Because the demodulator 442 outputs likelihood values for bits, and not the bits themselves, the demodulator 442 is called a "soft" demodulator. By contrast, demodulators that output bits are called "hard-decision demodulators," or simply "hard demodulators."

As illustrated in FIG. 4, the multi-stream demodulator 442 may include various modules and/or components. For example, the multi-stream demodulator 442 may include a likelihood value calculator 454 for calculating likelihood values $L(b_{s,1}), L(b_{s,2}), \ldots, L(b_{s,W})$. The multi-stream demodulator 442 may further include a symbol slicer 452 that performs various symbol slicing operations (eg., QAM slicing), including known symbols slicing operations. Still further, the multi-stream demodulator 442 may include a channel estimator 448 to estimate the MIMO communication channel H and a noise estimator 446 for generating noise estimate information, including, for example, the variance of the noise $\sigma_z^2$.

The multi-stream demodulator 442, in some embodiments, or in some modes of operation, may not include one or more of the modules 446-454 or, alternatively, may not use each of the modules 446-454 in demodulating the received signals. Further, it will be appreciated that some of the modules 446-454 may be combined. Still further, the multi-stream demodulator 442 and/or the receiving device 400 may include additional components and/or modules that, for ease of explanation, are not shown in FIG. 4. For example, the receiving device 400 may include a linear equalizer, e.g., a zero-forcing equalizer, that may be used by the multi-stream demodulator 442 to estimate the transmitted data values, $x_s$ from the received signal $y_s$ by assuming the noise vector z is zero. Additionally the receiving device 400 may include a deinterleaver that rearranges scattered bits and restores the proper bit sequence, an analog RF front end that performs frequency downconversion, various filters, power amplifiers, and so on.

Different components and/or modules of the receiving device 400 may be implemented as hardware, a processor executing software instructions, a processor implementing firmware instructions, or some combination thereof. For example, some or all of the components may be custom integrated circuits, application-specific integration circuits (ASICs), etc., communicatively coupled by electrical busses. In this case, the receiving device 400 optionally may include bypass busses (not shown) to bypass some of the components if the currently active MIMO mode does not require certain operations, such as processing multiple presentations of a symbol encoded according to a space-time encoding scheme.

In order to calculate the likelihood values $L(b_{s,1}), L(b_{s,2}), L(b_{s,W})$ for the received symbols, the multi-stream demodulator 442 may calculate a log-likelihood ratio (LLR) for each bit $b_{s,1}, b_{s,2}, \ldots, b_{s,W}$, using various techniques, including exhaustive maximum-likelihood (ML) techniques The LLR of a given bit $b_{s,n}$ may be an indication of whether the bit $b_{s,n}$ is more likely to be 1 or 0, and it may be calculated as follows:

$$L(b_{s,n}) = \log\left(\frac{P\{y \mid b_{s,n} = 1\}}{P\{y \mid b_{s,n} = 1\}}\right) = \log(P\{y \mid b_{s,n} = 1\}) - \log(P\{y \mid b_{s,n} = 0\}) \quad (1)$$

where P{y|$b_{s,n}$=0} is the probability that the bit $b_{s,n}$ is equal to 0 and P{y|$b_{s,n}$=1} is the probability that the bit $b_{s,n}$ is equal to 1. If the calculated L($b_{s,n}$) is a relatively large positive number, the probability that the bit $b_{s,n}$ is equal to 1 may be much greater than the probability that the bit $b_{s,n}$ is equal to 0, and the decoder 444 may therefore conclude that bit $b_{s,n}$ is equal to 1. Likewise, if the calculated L($b_{s,n}$) is a large negative number, the probability that the bit $b_{s,n}$ is equal to 0 may be much greater than the probability that the bit $b_{s,n}$ is equal to 1, and the decoder 444 may therefore conclude that bit $b_{s,n}$ is equal to 0. If the calculated L($b_{s,n}$) is neither a large positive number nor a large negative number, the decoder 444 may need to perform additional processing to estimate the value of bit $b_{s,n}$. As explained above, the receiving device 400 may receive more than one representation of bit $b_{s,n}$, e.g., via different ones of the receive antennas 402-408. Accordingly, the decoder 444 may use multiple LLRs corresponding to multiple representations of the same bit $b_{s,n}$ to estimate the value of bit $b_{s,n}$.

In order to estimate the probability that bit $b_{s,n}$ is equal to 1 and the probability that bit $b_{s,n}$ is equal to 0, the multi-stream demodulator 442 may use the following equations:

$$P\{y \mid b_{s,n} = 1\} = \sum_{x \in X_{s,n}^{(1)}} \exp\left(-\frac{\|y - Hx\|^2}{\sigma_z^2}\right) \quad (2)$$

$$P\{y \mid b_{s,n} = 0\} = \sum_{x \in X_{s,n}^{(0)}} \exp\left(-\frac{\|y - Hx\|^2}{\sigma_z^2}\right) \quad (3)$$

where, as in equation (1), x is a vector of estimated transmitted symbols $x_1, x_2, \ldots, x_S$, $x \in X_{s,n}^{(1)}$ is a set of all possible data symbols $x_s$ with bit $b_{s,n}$ equal to 1, $x \in X_{s,n}^{(0)}$ is a set of all possible data symbols $x_s$ with bit $b_{s,n}$ equal to 0, y represents, in vector form, received symbols $y_1, y_2, \ldots, y_{N_R}$, H represents a MIMO communication channel, and $\sigma_z$ represents variance of noise.

Combining equations (1)-(3), the LLR of a given bit $b_{s,n}$ in a given stream s may be calculated as:

$$L(b_{s,n}) = \log\left(\sum_{x \in X_{s,n}^{(1)}} \exp\left(-\frac{\|y - Hx\|^2}{\sigma_z^2}\right)\right) - \log\left(\sum_{x \in X_{s,n}^{(0)}} \exp\left(-\frac{\|y - Hx\|^2}{\sigma_z^2}\right)\right) \quad (4)$$

and L($b_{s,n}$) may be approximated as:

$$L(b_{s,n}) \approx \frac{1}{\sigma_z^2}\left[\min_{x \in X_{2,n}^{(0)}} \|y - Hx\|^2 - \min_{x \in X_{s,n}^{(1)}} \|y - Hx\|^2\right] \quad (5)$$

Accordingly, the LLR of a given bit $b_{s,n}$ may be calculated based on the distances $\|y-Hx\|^2$. More specifically, the LLR of a given bit $b_{s,n}$ may be calculated based on the difference between the smallest distance $\|y-Hx\|^2$ for a set of all possible data symbols $x_s$ with $b_{s,n}$ equal to 0 and the smallest distance $\|y-Hx\|^2$ for a set of all possible data symbols $x_s$ with $b_{s,n}$ equal to 1.

Calculating the LLR of a given bit L($b_{s,n}$) in accordance with equation (5) requires a calculation of $\|y-Hx\|^2$ for every constellation point in the constellation set in order to determine the smallest distance. Moreover, if there are multiple streams, a calculation of $\|y-Hx\|^2$ is required for every constellation point for every stream. Therefore, if a receiving device receives S streams, for example, and each stream is represented by W bits and modulated using an M-QAM scheme (where M=$2^W$), the receiving device will need to perform $M^S$ calculations of $\|y-Hx\|^2$ to demodulate the received S streams in accordance with equation (5).

In practice, it may be burdensome for a receiving device to calculate $\|y-Hx\|^2$ for every constellation point and for every streams. As the number of streams S and/or the number of bits W in a data symbol increases (i.e., as M increases), performing these calculations may require escalating complexity on the receiving device (e.g., more, larger, and/or more expensive processing modules and/or components). Performing these calculations may also lead to an increase in processing time. Accordingly, in order to reduce complexity, it is advantageous to utilize a demodulation technique that performs fewer than $M^S$ calculations of $\|y-Hx\|^2$ when calculating LLRs for received data corresponding to multiple streams.

A variety of techniques may be used to reduce the number of $\|y-Hx\|^2$ calculations for the case of two streams $x_1$, $x_2$ (S=2), as described, for instance, in U.S. Ser. No. 12/406,587, now U.S. Pat. No. 8,331,475, entitled "Low Complexity Technique for Log-Likelihood Ratio Computation," which was filed on Mar. 18, 2009, and which is herein incorporated by reference in its entirety. In particular, instead of calculating the squared distance $\|y-Hx\|^2$ for all combinations of $x_1$ and $x_2$, the squared distance $\|y-Hx\|^2$ for a given $x_2$ may be calculated only for the optimum value of $x_1$ that minimizes that squared distance, and vice versa. Because determining the optimum value of $x_1$ that minimizes $\|y-Hx\|^2$ may be reduced to a one-dimensional problem, the optimum value of $x_1$ may be determined using efficient one-dimensional techniques, such as slicing, scaling, rounding, gray-coding, etc., and without any additional calculations of $\|y-Hx\|^2$.

More specifically, in the case of two streams, LLRs for the second stream $x_2$ may be calculated using the following, or a similar, equation:

$$L(b_{2,n}) \approx \frac{1}{\sigma_z^2}\left[\min_{x_2 \in \tilde{X}_{2,n}^{(0)}}\left(\min_{x_1}\|y - Hx\|^2\right) - \min_{x_2 \in \tilde{X}_{2,n}^{(1)}}\left(\min_{x_1}\|y - Hx\|^2\right)\right] \quad (6)$$

where $\tilde{X}_{2,n}^{(0)}$ is a set of all possible data symbols of the second stream $x_2$ with $b_{2,n}$=0 and $\tilde{X}_{2,n}^{(1)}$ is a set of all possible data symbols of the second stream $x_2$ with $b_{2,n}$=1. Conceptually, an optimum value of $x_1$ may be found for a given $x_2$ (e.g., using slicing and/or scaling), and then the minimum squared distance $\|y-Hx\|^2$ may be found using that optimum value of $x_1$.

Likewise, LLRs for the first stream $x_1$ may be calculated using the following, or a similar, equation:

$$L(b_{1,n}) \approx \frac{1}{\sigma_z^2}\left[\min_{x_1 \in \tilde{X}_{1,n}^{(0)}}\left(\min_{x_2}\|y - Hx\|^2\right) - \min_{x_1 \in \tilde{X}_{1,n}^{(1)}}\left(\min_{x_2}\|y = Hx\|^2\right)\right] \quad (7)$$

where $\tilde{X}_{1,n}^{(0)}$ is a set of all possible data symbols of the first stream $x_1$ with $b_{1,n}$=0 and $\tilde{X}_{1,n}^{(1)}$ is a set of all possible data symbols of the first stream $x_1$ with $b_{1,n}$=1. That is, an optimum value of $x_2$ may be found for a given $x_1$, (e.g., using slicing/scaling), and then the minimum squared distance $\|y-Hx\|^2$ may be found using that optimum value of $x_2$.

A number of techniques may be used to reduce the number of $\|y-Hx\|^2$ calculations when calculating LLRs for transmitted symbols in the case of more than two streams $x_1, \ldots, x_S$.

Figure 5:
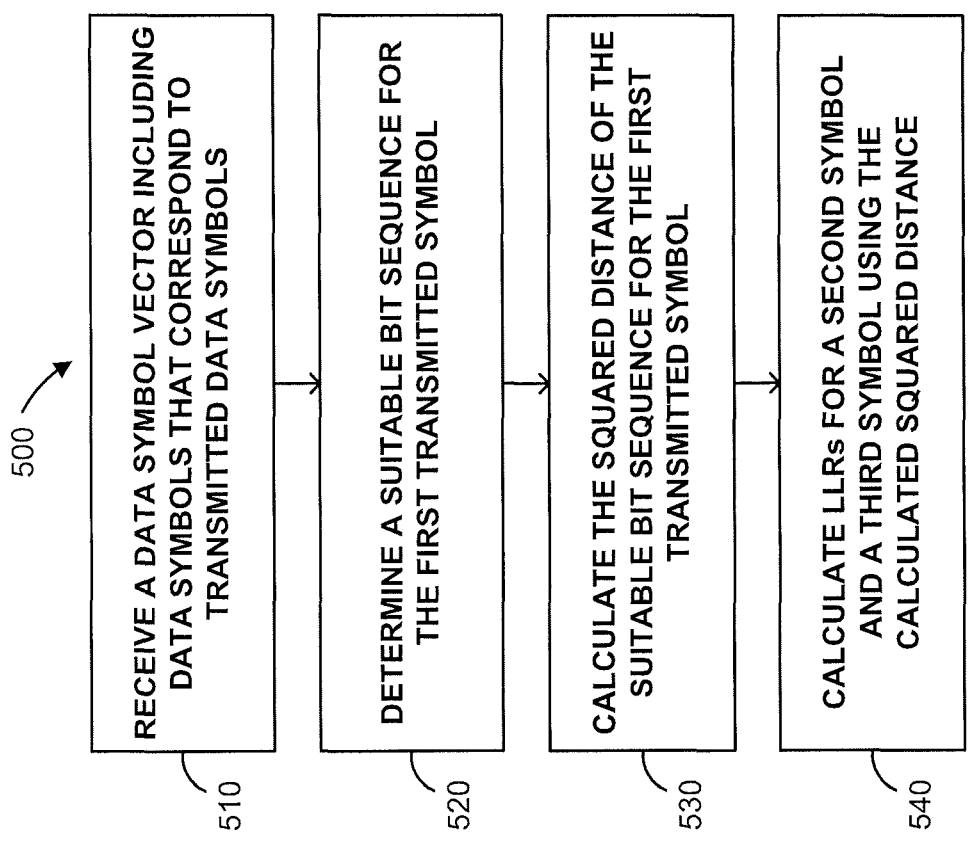
FIG. 5 is a flow diagram of an example multi-stream soft demodulation method using a hard-decision scheme.

For instance, FIG. 5 is a flow diagram of an example multi-stream demodulation method 500 for calculating LLRs in the case of three streams $x_1$, $x_2$, $x_3$ (S=3). For ease of explanation, FIG. 5 will be described with reference to FIGS. 1, 2A, 2B and 4. It will be understood, however, that the method 500 for calculating LLRs may be utilized with systems and devices other than those illustrated in FIGS. 1, 2A, 2B and 4.

Generally, the example low-complexity method 500 may calculate LLRs for three symbols using, for example, the following, or similar, equations:

$$L(b_{1,n}) \approx \frac{1}{\sigma_z^2} \left[ \min_{x_1 \in \tilde{X}_{1,n}^{(0)}, x_3} \left( \min_{x_2} \|y - Hx\|^2 \right) - \min_{x_1 \in \tilde{X}_{1,n}^{(1)}, x_3} \left( \min_{x_2} \|y - Hx\|^2 \right) \right] \quad (8)$$

$$L(b_{2,n}) \approx \frac{1}{\sigma_z^2} \left[ \min_{x_2 \in \tilde{X}_{2,n}^{(0)}, x_3} \left( \min_{x_1} \|y - Hx\|^2 \right) - \min_{x_2 \in \tilde{X}_{2,n}^{(1)}, x_3} \left( \min_{x_1} \|y - Hx\|^2 \right) \right] \quad (9)$$

$$L(b_{3,n}) \approx \frac{1}{\sigma_z^2} \left[ \min_{x_3 \in \tilde{X}_{3,n}^{(0)}, x_2} \left( \min_{x_1} \|y - Hx\|^2 \right) - \min_{x_3 \in \tilde{X}_{3,n}^{(1)}, x_2} \left( \min_{x_1} \|y - Hx\|^2 \right) \right] \quad (10)$$

where $\tilde{X}_{1,n}^{(b)}$ is a set of all possible data symbols of the first stream $x_1$ with $b_{1,n}=b$, $\tilde{X}_{2,n}^{(b)}$ is a set of all possible data symbols of the second stream $x_2$ with $b_{2,n}=b$, and $\tilde{X}_{3,n}^{(b)}$ is a set of all possible data symbols of the third stream $x_3$ with $b_{3,n}=b$, where b is equal to either 1 or 0. Accordingly, LLRs for bits in the second and third streams $x_2$, $x_3$, for example, may be calculated by calculating the minimum squared distance $\min\|y-Hx\|^2$ for every possible set $(x_2, x_3)$. That is, the squared distance $\|y-Hx\|^2$ for a given set $(x_2, x_3)$ may be calculated only for the $x_1$ that minimizes the squared distance.

More specifically, referring to FIG. 5, when a receiving device (such as the receiving device 400 illustrated in FIG. 4) receives a data symbol vector y (block 510) including three streams (where the streams may be received at a substantially the same time, via multiple spatial streams, for example), the receiving device may determine the optimum symbol $\hat{x}_1$ (i.e., the optimum bit sequence for $x_1$) that minimizes the squared distance $\|y-Hx\|^2$ (block 620) for a given combination of $x_2$ and $x_3$. The optimum symbol $\hat{x}_1$ may be determined in a number of ways. In one implementation, $\hat{x}_1$ may be determined using the following, or a similar equation:

$$\hat{x}_1 = \operatorname*{argmin}_{x_1} \left\| y - H \begin{bmatrix} x_1 \\ x_2 \\ x_3 \end{bmatrix} \right\|^2 \quad (11)$$

$$= \operatorname*{argmin}_{x_1} \|\tilde{y} - h_1 x_1\|^2$$

$$= \operatorname*{argmin}_{x_1} \left| \frac{h_1^H \tilde{y}}{\|h_1\|^2} - x_1 \right|^2$$

where $\tilde{y}=y-h_2 x_2-h_3 x_3$.

After determining the optimum symbol $\hat{x}_1$ that minimizes the squared distance $\|y-Hx\|^2$ for a given combination of $x_2$ and $x_3$ (block 520), the receiving device may use the optimum symbol $\hat{x}_1$ to calculate the minimum squared distance $$\min_{x_1} \|\tilde{y} - Hx\|^2 = \|\tilde{y} - h_1 \hat{x}_1\|^2$$

(block 530). The receiving device may then use the calculated squared distance to calculate LLRs for the second and third symbols $x_2$, $x_3$ (block 540), e.g., by plugging that distance into equations (9) and (10), respectively.

The LLRs for the first symbol $x_1$ may be calculated in a similar fashion. For example, the receiving device may determine the optimum symbol $\hat{x}_2$ that minimizes the squared distance $\|y-Hx\|^2$, use the optimum symbol $\hat{x}_2$ to calculate the minimum squared distance $$\min_{x_2} \|\tilde{y} - Hx\|^2 = \|\tilde{y} - h_2 \hat{x}_2\|^2,$$

where $\tilde{y}=y-h_1 x_1-h_3 x_3$, and calculate the LLRs using that distance (e.g., using equation 8). Alternatively, the receiving device may determine the optimum symbol $\hat{x}_3$ that minimizes the squared distance $\|y-Hx\|^2$ use the optimum symbol $\hat{x}_3$ to calculate the minimum squared distance $$\min_{x_3} \|\tilde{y} - Hx\|^2 = \|\tilde{y} - h_3 \hat{x}_3\|^2,$$

where $\tilde{y}=y-h_1 x_1-h_2 x_2$, and calculate the LLRs using that distance. As a result, if symbols $x_1$, $x_2$, $x_3$ are encoded with TV bits, and each symbol has $M=2^W$ possible sequences, the method 500 for calculating LLRs for three streams described above in reference to FIG. 5 yields $2M^2$ calculations of $\|y-Hx\|^2$, where $M^2$ calculations are required for two of the equations (9)-(11) (e.g., equation (9) and equation (10)), and $M^2$ calculations are required for the third equation, e.g., equation (11). The method 500 described above for calculating LLRs is therefore of higher efficiency and lower complexity, as compared to the conventional exhaustive maximum-likelihood techniques that may require $M^3$ calculations of $\|y-Hx\|^2$ for three streams.

Figure 6:
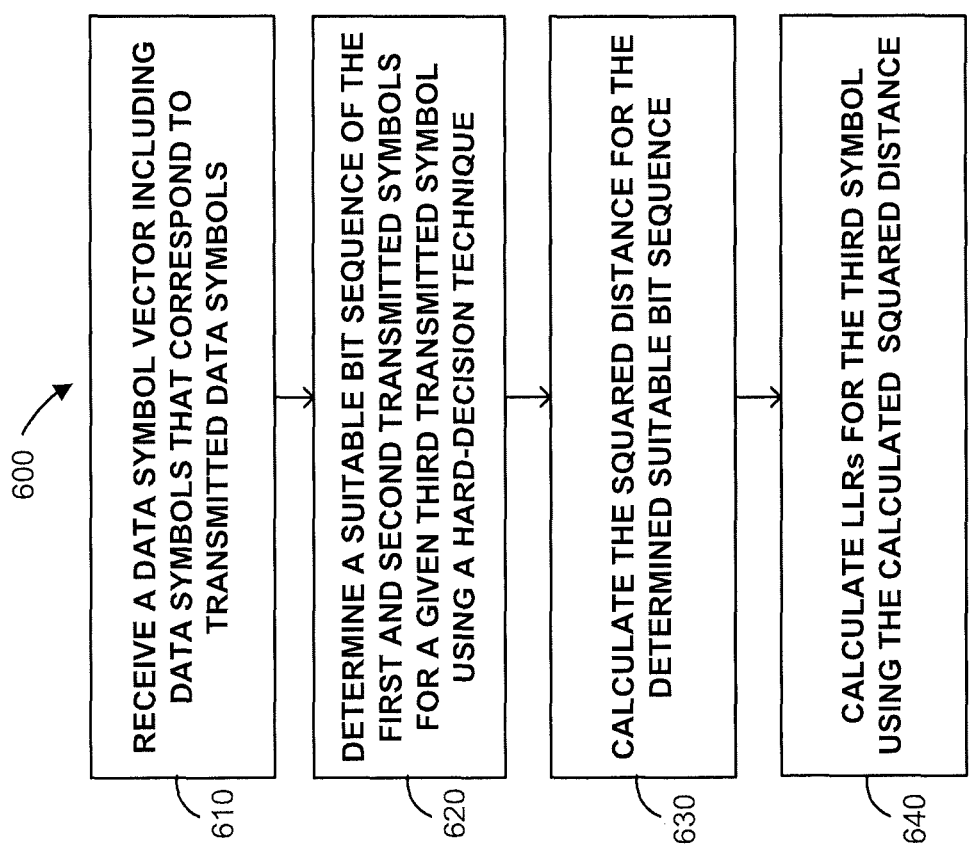
FIG. 6 is a flow diagram of another example multi-stream soft demodulation method using a hard-decision scheme.

FIG. 6 is a flow diagram of another example multi-stream demodulation method 600 for calculating LLRs for received data. For ease of explanation, FIG. 6 will be described with reference to FIGS. 1, 2A, 2B and 4. It will be understood, however, that the method 600 for calculating LLRs may be utilized with systems and devices other than those illustrated in FIGS. 1, 2A, 2B and 4.

Generally, the example multi-stream demodulation method 600 may calculate LLRs for three symbols using, for example, the following equations:

$$L(b_{1,n}) \approx \frac{1}{\sigma_z^2} \left[ \min_{x_1 \in \tilde{X}_{1,n}^{(0)}} \left( \min_{x_2, x_3} \|y - Hx\|^2 \right) - \min_{x_1 \in \tilde{X}_{1,n}^{(1)}} \left( \min_{x_2, x_3} \|y - Hx\|^2 \right) \right] \quad (12)$$

$$L(b_{2,n}) \approx \frac{1}{\sigma_z^2} \left[ \min_{x_2 \in \tilde{X}_{2,n}^{(0)}} \left( \min_{x_1, x_3} \|y - Hx\|^2 \right) - \min_{x_2 \in \tilde{X}_{2,n}^{(1)}} \left( \min_{x_1, x_3} \|y - Hx\|^2 \right) \right] \quad (13)$$

$$L(b_{3,n}) \approx \frac{1}{\sigma_z^2} \left[ \min_{x_3 \in \tilde{X}_{3,n}^{(0)}} \left( \min_{x_1, x_2} \|y - Hx\|^2 \right) - \min_{x_3 \in \tilde{X}_{3,n}^{(1)}} \left( \min_{x_1, x_2} \|y - Hx\|^2 \right) \right] \quad (14)$$

Accordingly, LLRs for the third symbol $x_3$, for example, may be calculated by calculating a minimum squared distance $$\min_{x_1,x_2} \|y - Hx\|^2$$

for every possible $x_3$.

More specifically, referring to FIG. 6, when a receiving device (such as the receiving device 400 illustrated in FIG. 4) receives a data symbol vector y (block 610) including three streams (where the streams may be received at substantially the same time, via multiple spatial streams, for example), the receiving device may determine the "suitable" vector $$\begin{bmatrix} \hat{x}_1 \\ \hat{x}_2 \end{bmatrix}$$

for a given $x_3$ (block 620). The suitable vector $$\begin{bmatrix} \hat{x}_1 \\ \hat{x}_2 \end{bmatrix}$$

may be determined in a number of ways. In one implementation, $$\begin{bmatrix} \hat{x}_1 \\ \hat{x}_2 \end{bmatrix}$$

may be determined using the following equation:

$$\begin{bmatrix} \hat{x}_1 \\ \hat{x}_2 \end{bmatrix} = \operatorname*{argmin}_{x_1,x_2} \left\| y - H \begin{bmatrix} x_1 \\ x_2 \\ x_3 \end{bmatrix} \right\|^2 = \operatorname*{argmin}_{x_1,x_2} \left\| \tilde{y} - [h_1 \ h_2] \begin{bmatrix} x_1 \\ x_2 \end{bmatrix} \right\|^2 \quad (15)$$

where $\tilde{y}=y-h_3 x_3$.

It should be noted that determining the suitable vector $$\begin{bmatrix} \hat{x}_1 \\ \hat{x}_2 \end{bmatrix}$$

is a two-dimensional hard-decision problem. Efficient hard maximum-likelihood (ML) demodulation schemes, such as sphere decoding, may be used to determine an "optimum" suitable vector $$\begin{bmatrix} \hat{x}_1 \\ \hat{x}_2 \end{bmatrix}$$

that substantially minimizes the squared distance $\|y-Hx\|^2$ with a complexity lower than that of exhaustive ML demodulation. Suboptimal hard-decision schemes (e.g., zero-forcing, minimum mean-squared error (MMSE) demodulation, etc.) may also be used to determine a "near-optimum" suitable vector $$\begin{bmatrix} \hat{x}_1 \\ \hat{x}_2 \end{bmatrix},$$

but may provide a worse performance as compared to more efficient hard ML demodulation schemes because the selected near-optimum suitable vector $$\begin{bmatrix} \hat{x}_1 \\ \hat{x}_2 \end{bmatrix}$$

may not be the same as the optimum suitable vector $$\begin{bmatrix} \hat{x}_1 \\ \hat{x}_2 \end{bmatrix}$$

that minimizes the distance $\|y-Hx\|^2$. Nevertheless, such hard-decision schemes may be optimal in particular cases, e.g., when at least one of three channel vectors is independent from the other two. The term "suitable vector," as used herein, will therefore encompass both an optimum suitable vector and a near-optimum suitable vector.

With continued reference to FIG. 6, after determining the suitable vector $$\begin{bmatrix} \hat{x}_1 \\ \hat{x}_2 \end{bmatrix},$$

e.g., that substantially minimizes the squared distance $\|y-Hx\|^2$ for a given $x_3$, (block 620), the receiving device may use the determined suitable vector $$\begin{bmatrix} \hat{x}_1 \\ \hat{x}_2 \end{bmatrix}$$

to calculate the minimum squared distance $$\min_{x_1,x_2} \|\tilde{y} - Hx\|^2 = \left\| \tilde{y} - [h_1 \ h_2] \begin{bmatrix} \hat{x}_1 \\ \hat{x}_2 \end{bmatrix} \right\|^2$$

using that suitable vector $$\begin{bmatrix} \hat{x}_1 \\ \hat{x}_2 \end{bmatrix}$$

(block 630). The receiving device may then use this calculated squared distance to calculate LLRs for the third symbol $x_3$ (block 640), e.g., by plugging the calculated squared distance in equation (14).

The LLRs for the first and second symbols $x_1$, $x_2$ may be calculated in a similar fashion. For example, to calculate the LLRs for the first symbol $x_1$, the receiving device may determine the suitable vector $$\begin{bmatrix} \hat{x}_2 \\ \hat{x}_3 \end{bmatrix},$$

e.g., that substantially minimizes the squared distance $\|y-Hx\|^2$ for a given $x_1$, use the determined suitable vector $$\begin{bmatrix} \hat{x}_2 \\ \hat{x}_3 \end{bmatrix}$$

to calculate the minimum squared distance $$\min_{x_2,x_3}\|\tilde{y} - Hx\|^2 = \left\|\tilde{y} - [h_2 \quad h_3]\begin{bmatrix} \hat{x}_2 \\ \hat{x}_3 \end{bmatrix}\right\|^2$$

for that suitable vector $$\begin{bmatrix} \hat{x}_2 \\ \hat{x}_3 \end{bmatrix}$$

where $\tilde{y}=y-h_1 x_1$, and use this calculated squared distance to calculate LLRs, e.g., by plugging the calculated squared distance in equation (12). Similarly, to calculate the LLRs for the second symbol $x_2$, the receiving device may determine the suitable vector $$\begin{bmatrix} \hat{x}_1 \\ \hat{x}_3 \end{bmatrix},$$

e.g., that substantially minimizes the squared distance $\|y-Hx\|^2$ for a given $x_2$, use the suitable vector $$\begin{bmatrix} \hat{x}_1 \\ \hat{x}_3 \end{bmatrix}$$

to calculate the minimum squared distance $$\min_{x_1,x_3}\|\tilde{y} - Hx\|^2 = \left\|\tilde{y} - [h_1 \quad h_3]\begin{bmatrix} \hat{x}_1 \\ \hat{x}_3 \end{bmatrix}\right\|^2$$

for that suitable vector $$\begin{bmatrix} \hat{x}_1 \\ \hat{x}_3 \end{bmatrix},$$

where $\tilde{y}=y-h_2 x_2$, and use this calculated squared distance to calculate LLRs, e.g., by plugging the calculated squared distance in equation (13).

The method 600 for calculating LLRs described above in reference to FIG. 6 is generally of higher efficiency and lower complexity, as compared to the conventional methods, such as the exhaustive maximum-likelihood techniques that may require $M^3$ calculations of $\|y-Hx\|^2$ for three streams $x_s$. Generally, if symbols $x_1$, $x_2$, $x_3$ each represent W bits, and each symbol has $M=2^W$ possible sequences, the method 600 for calculating LLRs discussed above in reference to FIG. 6 may result in $3\alpha M$ calculations of $\|y-Hx\|^2$, where $\alpha$ is the average number of calculations of $\|y-Hx\|^2$ for the hard-decision technique employed in determining the suitable vector $$\begin{bmatrix} \hat{x}_1 \\ \hat{x}_2 \end{bmatrix}$$

(block 620). If $\alpha<M^2/S$, the method 600 described above for calculating LLRs may be of higher efficiency and lower complexity, as compared to the conventional techniques, such as exhaustive maximum-likelihood techniques. It should be noted that if the zero-forcing technique and/or the MMSE technique is employed as the hard-decision technique for determining the suitable vector $$\begin{bmatrix} \hat{x}_1 \\ \hat{x}_2 \end{bmatrix},$$

$\alpha$ may be equal to 1.

Although the example methods 500 and 600 for calculating LLRs discussed above in reference to FIGS. 5-6 have been described as separate methods, these and other methods may be used in combination. For example, in the case of three streams, LLR for bits in the second stream or in the third stream may be calculated using the method 500 discussed in reference to FIG. 5, whereas LLR for bits in the first stream may be calculated using method 600 discussed in reference to FIG. 6. Of course, other combinations are possible.

Figure 7:
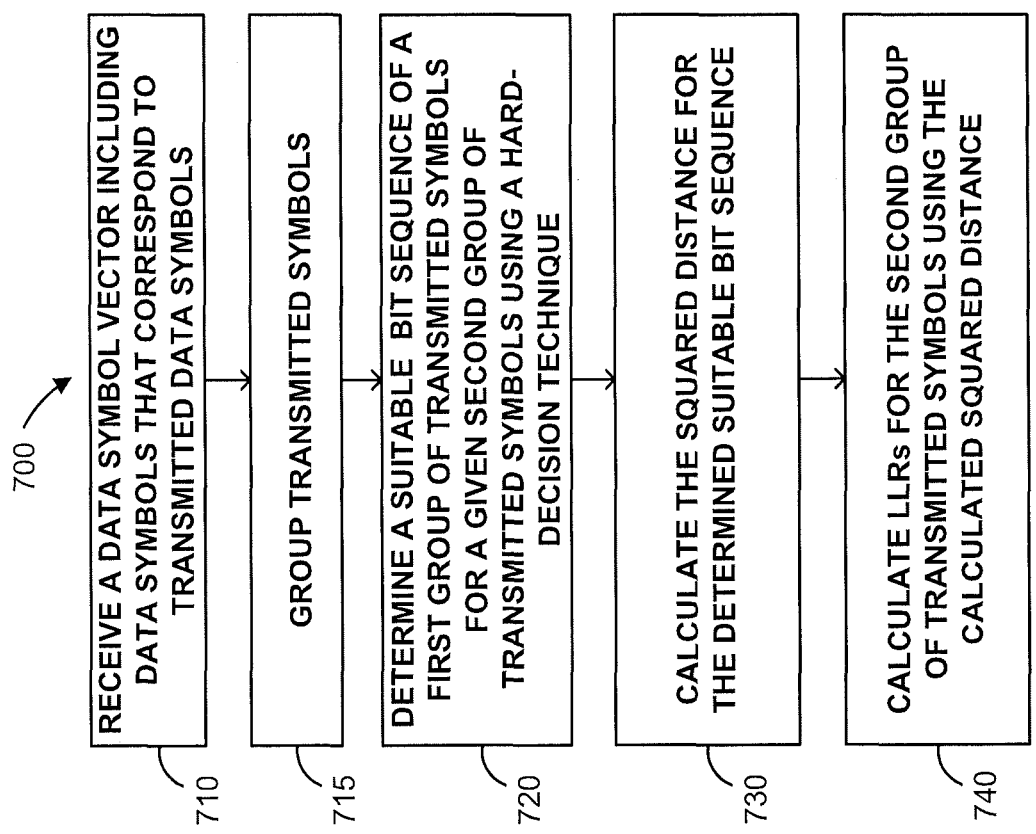
FIG. 7 is a flow diagram of yet another example multi-stream soft demodulation method using a hard-decision scheme.

FIG. 7 is a flow diagram of an example multi-stream demodulation method 700 for calculating LLRs for received data. For ease of explanation, FIG. 7 will be described with reference to FIGS. 1, 2A, 2B and 4. It will be understood, however, that the method 700 for calculating LLRs may be utilized with systems and devices other than those illustrated in FIGS. 1, 2A, 2B and 4.

Generally, an example multi-stream demodulation method 700 may be used to calculate LLRs for bits $b_{s,n}$ of S symbols $x_s$ by using the following, or a similar, equation:

$$L(b_{s,n}) \approx \frac{1}{\sigma_z^2}\left[\min_{x_{K+1},\ldots,x_{s-1},x_s\in\tilde{X}_{s,n}^{(1)},x_{s+1},\ldots,x_S}\left(\min_{x_1,\ldots,x_K}\|y-Hx\|^2\right) - \min_{x_{K+1},\ldots,x_{s-1},x_s\in\tilde{X}_{s,n}^{(0)},x_{s+1},\ldots,x_S}\left(\min_{x_1,\ldots,x_K}\|y-Hx\|^2\right)\right] \quad (16)$$

where $K<s\leq S$, and $\tilde{X}_{s,n}^{(b)}$ is a set of all possible data symbols of the s-th stream with $b_{s,n}=b$, where b is equal to either 1 or 0. Similarly to the example methods illustrated in FIGS. 5 and 6, the distance $$\min_{x_1,\ldots,x_K}\|y-Hx\|^2$$

for a given $(x_{K+1},\ldots,x_S)$ may be calculated only for the $(x_1,\ldots,x_K)$ that minimizes the squared distance $$\min_{x_1,\dots,x_K} \|y - Hx\|^2.$$

More specifically, referring to FIG. 7, when a receiving device (such as the receiving device 400 illustrated in FIG. 4) receives a data symbol vector y (block 710) including S symbols (where the symbols may be received at a substantially the same time, via multiple streams, for example), the receiving device may group the transmitted data symbols x. (block 715), e.g., into one group $(x_1, \dots, x_K)$ and another group $(x_{K+1}, \dots, x_S)$. The receiving device may then determine the suitable vector $$\begin{bmatrix} \hat{x}_1 \\ \vdots \\ \hat{x}_K \end{bmatrix},$$

e.g., that substantially minimizes the squared distance $\|y-Hx\|^2$ for a given $x_{K+1}, \dots, x_S$ (block 720). The suitable vector $$\begin{bmatrix} \hat{x}_1 \\ \vdots \\ \hat{x}_K \end{bmatrix}$$

may be determined in a number of ways. In one implementation, $$\begin{bmatrix} \hat{x}_1 \\ \vdots \\ \hat{x}_K \end{bmatrix}$$

may be determined using the following, or a similar, equation:

$$\begin{bmatrix} \hat{x}_1 \\ \vdots \\ \hat{x}_K \end{bmatrix} = \operatorname*{argmin}_{x_1,x_2,\dots,x_K} \left\| y - H \begin{bmatrix} x_1 \\ \vdots \\ x_S \end{bmatrix} \right\|^2 = \operatorname*{argmin}_{x_1,x_2,\dots,x_K} \left\| \tilde{y} - [h_1\ h_2\ \dots\ h_K] \begin{bmatrix} x_1 \\ \vdots \\ x_K \end{bmatrix} \right\|^2 \quad (17)$$

where $$\tilde{y} = y - \sum_{s=K+1}^{S} h_s x_s.$$

In some embodiments, the suitable vector $$\begin{bmatrix} \hat{x}_1 \\ \vdots \\ \hat{x}_K \end{bmatrix}$$

may be determined using a K-dimensional hard-decision technique. In particular, efficient hard ML demodulation schemes, such as sphere decoding, may be used to determine the suitable vector $$\begin{bmatrix} \hat{x}_1 \\ \vdots \\ \hat{x}_K \end{bmatrix}$$

while yielding a complexity lower than that of exhaustive ML demodulation. While suboptimal hard-decision schemes (e.g., zero-forcing, minimum mean-squared error (MMSE) demodulation, etc.) may also be used to determine $$\begin{bmatrix} \hat{x}_1 \\ \vdots \\ \hat{x}_K \end{bmatrix},$$

they may result in suboptimal performance. Nevertheless, such hard-decision schemes may be optimal in particular cases.

With continued reference to FIG. 7, after determining the suitable vector $$\begin{bmatrix} \hat{x}_1 \\ \vdots \\ \hat{x}_K \end{bmatrix},$$

e.g., that substantially minimizes the squared distance $\|y-Hx\|^2$ for a given $x_{K+1}, \dots, x_S$ (block 720), the receiving device may use the suitable vector $$\begin{bmatrix} \hat{x}_1 \\ \vdots \\ \hat{x}_K \end{bmatrix}$$

to calculate the squared distance $$\min_{x_1,x_2,\dots,x_K} \|\tilde{y} - Hx\|^2 = \left\| \tilde{y} - [h_1\ h_2\ \dots\ h_K] \begin{bmatrix} \hat{x}_1 \\ \vdots \\ \hat{x}_K \end{bmatrix} \right\|^2$$

for that vector $$\begin{bmatrix} \hat{x}_1 \\ \vdots \\ \hat{x}_K \end{bmatrix}$$

(block squared distance 730). The receiving device may then use this calculated squared distance to calculate LLRs for $x_{K+1}, \ldots, x_S$ (block 740), e.g., by plugging the calculated squared distance in equation (16).

The multi-stream demodulation techniques have been described in terms of particular embodiments, but other embodiments are possible. For example, the multi-stream demodulation techniques have been described in reference to a wireless communication model where y=Hx+z. However, multi-stream demodulation techniques may be used with systems using other communication models. As one example, a receiving device may use the described multi-stream demodulation techniques in conjunction with any known techniques of QR decomposition of matrix H. Such a receiving device could, could us the following model:

$$\tilde{y}=Q^*y=Q^*Hx+Q^*z=Rx+\tilde{z} \quad (18)$$

where * denotes a complex conjugate.

The model (18) has a similar form as the y=Hx+z model, except that the matrix R is an upper triangular matrix. Q matrix is a unitary matrix and the R matrix may be represented as $$R = \begin{bmatrix} r_{11} & r_{12} \\ 0 & r_{22} \end{bmatrix}.$$

This feature of the matrix R may further lower the complexity of the multi-stream demodulation techniques described above because the computations at the elements of zero in R are not required. Similar to a QR decomposition technique, other linear processing techniques may be applied to y.

At least some of the various blocks, operations, and techniques described above may be implemented using hardware, a processor executing firmware instructions, a processor executing software instructions, or any combination thereof. When implemented using a processor executing firmware or software instructions, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method of decoding a signal transmitted via a multiple input multiple output (MIMO) communication channel, the method comprising:

receiving a data symbol vector having a plurality of data symbols received via a plurality of spatial streams, the received data symbol vector corresponding to a transmitted data symbol vector having a plurality of transmitted data symbols corresponding to the plurality of data symbols;

estimating, using a hard-decision technique, one or more respective values for one or more first transmitted data symbols in a first set of one or more spatial streams of the plurality of spatial streams; and calculating, using a soft decision technique and based on the estimated one or more respective values for the one or more first transmitted data symbols, likelihood values for bits corresponding to one or more second transmitted data symbols in a second set of one or more spatial streams of the plurality of spatial streams.

2. The method of claim 1, wherein estimating one or more respective values for the one or more first transmitted data symbols comprises determining a suitable bit sequence corresponding to the one or more first transmitted data symbols for a given set of the one or more second transmitted data symbols, and wherein calculating likelihood values for bits corresponding to the one or more second transmitted data symbols comprises calculating the likelihood values based at least in part on the suitable bit sequence.

3. The method of claim 2, wherein the suitable bit sequence substantially minimizes a distance value corresponding to a squared distance between the received data symbol vector and a channel matrix H multiplied with a vector including data symbols corresponding to the one or more first transmitted data symbols and the one or more second transmitted data symbols.

4. The method of claim 3, further comprising calculating the distance value corresponding to the suitable bit sequence, and wherein calculating likelihood values for bits corresponding to the one or more second transmitted data symbols comprises calculating the likelihood values based at least in part on the calculated distance value corresponding to the suitable bit sequence.

5. The method of claim 4, wherein the one or more first transmitted data symbols correspond to transmitted data symbols $(x_1, \ldots, x_K)$ and the one or more second transmitted data symbols correspond to transmitted data symbols $(x_{K+1}, \ldots, x_S)$, where K<s≤S, and wherein determining the suitable bit sequence $$\begin{bmatrix} \hat{x}_1 \\ \vdots \\ \hat{x}_K \end{bmatrix}$$

comprises calculating:

$$\begin{bmatrix} \hat{x}_1 \\ \vdots \\ \hat{x}_K \end{bmatrix} = \underset{x_1, x_2, \ldots x_K}{\mathrm{argmin}} \left\| y - H \begin{bmatrix} x_1 \\ \vdots \\ x_S \end{bmatrix} \right\|^2 =$$

$$\underset{x_1, x_2, \ldots x_K}{\mathrm{argmin}} \left\| \tilde{y} - [h_1 \ h_2 \ \ldots \ h_K] \begin{bmatrix} x_1 \\ \vdots \\ x_K \end{bmatrix} \right\|^2$$

where $$\tilde{y} = y - \sum_{s=K+1}^{S} h_s x_s.$$

6. The method of claim 5, wherein calculating the distance value corresponding to the suitable bit sequence $$\hat{x} = \begin{bmatrix} \hat{x}_1 \\ \vdots \\ \hat{x}_K \end{bmatrix}$$

comprises calculating:

$$\underset{x_1, x_2, \ldots, x_K}{\min} \|\tilde{y} - Hx\|^2 = \left\| \tilde{y} - [h_1 \ h_2 \ \ldots \ h_K] \begin{bmatrix} \hat{x}_1 \\ \vdots \\ \hat{x}_K \end{bmatrix} \right\|^2.$$

7. The method of claim 6, wherein calculating a likelihood value $L(b_{s,n})$ for n-th bit in a transmitted symbol s comprises calculating:

$$L(b_{s,n}) \approx \frac{1}{\sigma_z^2} \begin{bmatrix} \underset{x_{K+1}, \ldots, x_{S-1}, x_S \in \tilde{X}_{s,n}^{(1)}, x_{s+1}, \ldots, x_S}{\min} \left( \underset{x_1, \ldots, x_K}{\min} \|y - Hx\|^2 \right) - \\ \underset{x_{K+1}, \ldots, x_{S-1}, x_S \in \tilde{X}_{s,n}^{(0)}, x_{s+1}, \ldots, x_S}{\min} \left( \underset{x_1, \ldots, x_K}{\min} \|y - Hx\|^2 \right) \end{bmatrix}$$

where $\tilde{X}_{s,n}^{(b)}$ is s a set of values for a given transmitted symbol s where the n-th bit of the given transmitted symbol s is equal to b, and wherein b is equal to either 1 or 0.

8. The method of claim 1, wherein the one or more first transmitted data symbols include a selected one of the plurality of transmitted data symbols and the one or more second transmitted data symbols include all but the selected one of the plurality of transmitted data symbols.

9. A device for decoding a signal transmitted via a multiple input multiple output (MIMO) communication channel, the device comprising:

a multi-stream demodulator configured to
receive a data symbol vector having a plurality of data symbols received via a plurality of spatial streams, the received data symbol vector corresponding to a transmitted data symbol vector having a plurality of transmitted data symbols corresponding to the plurality of data symbols,
estimate, using a hard-decision technique, one or more respective values for one or more first transmitted data symbols in a first set of one or more spatial streams of the plurality of spatial streams, and
calculate, using a soft decision technique and based on the estimated one or more respective values for the one or more first transmitted data symbols, likelihood values for bits corresponding to one or more second transmitted data symbols in a second set of one or more spatial streams of the plurality of spatial streams; and
a decoder configured to decode at least some of the data symbols in the received data symbol vector based at least in part on the calculated likelihood values.

10. The device of claim 9, wherein the multi-stream demodulator is configured to:
estimate the one or more respective values for the one or more first transmitted data symbols at least by determining a suitable bit sequence corresponding to the one or more first transmitted data symbols for a given set of the one or more second transmitted data symbols, and
calculate the likelihood values for bits corresponding to the one or more second transmitted data symbols based at least in part on the suitable bit sequence.

11. The device of claim 10, wherein the suitable bit sequence substantially minimizes a distance value corresponding to a squared distance between the received data symbol vector and a channel matrix H multiplied with a vector including data symbols corresponding to the one or more first transmitted data symbols and the one or more second transmitted data symbols.

12. The device of claim 11, wherein the multi-stream demodulator is further configured to:
calculate the distance value corresponding to the suitable bit sequence, and
calculate the likelihood values for bits corresponding to the one or more second transmitted data symbols based at least in part on the calculated distance value corresponding to the suitable bit sequence.

13. The device of claim 12, wherein the one or more first transmitted data symbols correspond to transmitted data symbols $(x_1, \ldots, x_K)$ and the one or more second transmitted data symbols correspond to transmitted data symbols $(x_{K+1}, \ldots, x_S)$, where $K < s \leq S$, and wherein the multi-stream demodulator is configured to determine the suitable bit sequence $$\begin{bmatrix} \hat{x}_1 \\ \vdots \\ \hat{x}_K \end{bmatrix}$$

at least by calculating:

$$\begin{bmatrix} \hat{x}_1 \\ \vdots \\ \hat{x}_K \end{bmatrix} = \underset{x_1, x_2, \ldots, x_K}{\mathrm{argmin}} \left\| y - H \begin{bmatrix} x_1 \\ \vdots \\ x_S \end{bmatrix} \right\|^2 = \underset{x_1, x_2, \ldots, x_K}{\mathrm{argmin}} \left\| \tilde{y} - [h_1 \ h_2 \ \ldots \ h_K] \begin{bmatrix} x_1 \\ \vdots \\ x_K \end{bmatrix} \right\|^2$$

where $$\tilde{y} = y - \sum_{s=K+1}^{S} h_s x_s.$$

14. The device of claim 13, wherein the multi-stream demodulator is configured to calculate the distance value corresponding to the suitable bit sequence $$\hat{x} = \begin{bmatrix} \hat{x}_1 \\ \vdots \\ \hat{x}_K \end{bmatrix}$$

at least by calculating:

$$\min_{x_1, x_2, \ldots, x_k} \|\tilde{y} - Hx\|^2 = \left\| \tilde{y} - [h_1 \ h_2 \ \ldots \ h_K] \begin{bmatrix} \hat{x}_1 \\ \vdots \\ \hat{x}_K \end{bmatrix} \right\|^2.$$

15. The device of claim 14, wherein the multi-stream demodulator is configured to calculate a likelihood value $L(b_{s,n})$ for n-th bit in a transmitted symbol s at least by calculating:

$$L(b_{s,n}) \approx \frac{1}{\sigma_z^2} \begin{bmatrix} \min_{x_{K+1}, \ldots, x_{S-1}, x_S \in \hat{X}_{s,n}^{(1)}, x_{s+1}, \ldots, x_S} \left( \min_{x_1, \ldots, x_K} \|y - Hx\|^2 \right) - \\ \min_{x_{K+1}, \ldots, x_{S-1}, x_S \in \hat{X}_{s,n}^{(0)}, x_{s+1}, \ldots, x_S} \left( \min_{x_1, \ldots, x_K} \|y - Hx\|^2 \right) \end{bmatrix}$$

where $\tilde{X}_{s,n}^{(b)}$ is s a set of values for a given transmitted symbol s where the n-th bit of the given transmitted symbol s is equal to b, and wherein b is equal to either 1 or 0.

16. The device of claim 9, wherein the one or more first transmitted data symbols include a selected one of the plurality of transmitted data symbols and the one or more second transmitted data symbols include all but the selected one of the plurality of transmitted data symbols.

17. A device for decoding a signal transmitted via a multiple input multiple output (MIMO) communication channel, the device comprising:
a multi-stream demodulator configured to
receive a data symbol vector comprising a plurality of data symbols that are received via different spatial streams, wherein the received data symbol vector corresponds to a transmitted data symbol vector comprising a plurality of transmitted data symbols corresponding to the plurality of data symbols,
estimate one or more respective values for transmitted data symbols in a first group of one or more transmitted data symbols using a hard-decision technique, wherein the first group of one or more transmitted data symbols is of the plurality of transmitted data symbols, and
calculate, using a soft decision technique, likelihood values for bits in a second group of one or more transmitted data symbols based on the estimated one or more respective values of the one or more transmitted data symbols in the first group of one or more transmitted data symbols, wherein the second group of one or more transmitted data symbols is of the plurality of transmitted data symbols, and wherein the first group of one or more transmitted data symbols and the second group of one or more transmitted data symbols do not include common transmitted data symbols; and
a decoder configured to decode at least some of the data symbols in the received data symbol vector based at least in part on the calculated likelihood values.

18. The device of claim 17, wherein the multi-stream demodulator is configured to:
estimate the one or more respective values for the one or more transmitted data symbols in the first group of one or more transmitted data symbols using the hard-decision technique at least by determining a suitable bit sequence corresponding to the first group of one or more transmitted data symbols for a given set of one or more respective values of the second group of one or more transmitted data symbols, and
calculate likelihood values for bits in the second group of one or more transmitted data symbols based at least in part on the suitable bit sequence.

19. The device of claim 18, wherein the suitable bit sequence substantially minimizes a distance value corresponding to a squared distance between the received data symbol vector and a channel matrix H multiplied with a vector including the first group of one or more transmitted data symbols and the second group of one or more transmitted data symbols.

20. The device of claim 19, wherein the multi-stream demodulator is further configured to:
calculate the distance value corresponding to the suitable bit sequence, and
calculate the likelihood values for bits in the second group of one or more transmitted data symbols based at least in part on the calculated distance value corresponding to the suitable bit sequence.

21. The device of claim 20, wherein:
the first group of one or more transmitted data symbols comprises one or more transmitted data symbols $(x_1, \ldots, x_K)$ and the second group of one or more transmitted data symbols comprises one or more transmitted data symbols $(x_{K+1}, \ldots, x_S)$, where $K < s \leq S$, and
the multi-stream demodulator is configured to determine the suitable bit sequence $$\begin{bmatrix} \hat{x}_1 \\ \vdots \\ \hat{x}_K \end{bmatrix}$$

by calculating:

$$\begin{bmatrix} \hat{x}_1 \\ \vdots \\ \hat{x}_K \end{bmatrix} = \underset{x_1, x_2, \ldots, x_K}{\operatorname{argmin}} \left\| y - H \begin{bmatrix} x_1 \\ \vdots \\ x_S \end{bmatrix} \right\|^2 = \underset{x_1, x_2, \ldots, x_K}{\operatorname{argmin}} \left\| \tilde{y} - [h_1 \ h_2 \ \ldots \ h_K] \begin{bmatrix} x_1 \\ \vdots \\ x_K \end{bmatrix} \right\|^2$$

where $\tilde{y} = y - \sum_{s=K+1}^{S} h_s x_s.$

22. The device of claim 21, wherein the multi-stream demodulator is configured to calculate the distance value corresponding to the suitable bit sequence $$\hat{x} = \begin{bmatrix} \hat{x}_1 \\ \vdots \\ \hat{x}_K \end{bmatrix}$$

at least by calculating:

$$\min_{x_1, x_2, \ldots, x_K} \|\tilde{y} - Hx\|^2 = \left\| \tilde{y} - [h_1 \; h_2 \; \ldots \; h_K] \begin{bmatrix} \hat{x}_1 \\ \vdots \\ \hat{x}_K \end{bmatrix} \right\|^2.$$

23. The device of claim 22, wherein the multi-stream demodulator is configured to calculate a likelihood value $L(b_{s,n})$ for n-th bit in a transmitted symbol s at least by calculating:

$$L(b_{s,n}) \approx \frac{1}{\sigma_z^2} \begin{bmatrix} \min_{x_{K+1}, \ldots, x_{S-1}, x_S \in \tilde{X}_{s,n}^{(1)}, x_{s+1}, \ldots, x_S} \left( \min_{x_1, \ldots, x_K} \|y - Hx\|^2 \right) - \\ \min_{x_{K+1}, \ldots, x_{S-1}, x_S \in \tilde{X}_{s,n}^{(0)}, x_{s+1}, \ldots, x_S} \left( \min_{x_1, \ldots, x_K} \|y - Hx\|^2 \right) \end{bmatrix}$$

where $\tilde{X}_{s,n}^{(b)}$ is s a set of values for a given transmitted symbol s where the n-th bit of the given transmitted symbol s is equal to b, and wherein b is equal to either 1 or 0.

24. The device of claim 17, wherein the first group of one or more transmitted data symbols comprises a selected one of the plurality of transmitted data symbols and the second group of one or more transmitted data symbols comprises all but the selected one of the plurality of transmitted data symbols.

* * * * *